United States Patent [19]

Watanabe et al.

[11] Patent Number: 5,109,236
[45] Date of Patent: Apr. 28, 1992

[54] SMOOTHNESS MEASURING DEVICE AND RECORDING APPARATUS TO WHICH THE SMOOTHNESS MEASURING DEVICE IS APPLIED

[75] Inventors: Youichi Watanabe, Machida; Junichi Yoshikawa, Tokyo, both of Japan

[73] Assignee: Canon Kabushiki Kaisha, Tokyo, Japan

[21] Appl. No.: 398,666

[22] Filed: Aug. 25, 1989

[30] Foreign Application Priority Data

Aug. 31, 1988 [JP] Japan .................. 63-214871
Aug. 4, 1989 [JP] Japan .................. 64-203031

[51] Int. Cl.$^5$ ............ G01D 15/10; H01J 5/16; G01N 9/04
[52] U.S. Cl. .............. 346/76 PH; 250/227.28; 250/560; 356/376
[58] Field of Search ........... 346/76 R; 250/227.28, 250/227.29, 560; 356/376

[56] References Cited

U.S. PATENT DOCUMENTS

| | | | |
|---|---|---|---|
| 3,732,430 | 5/1973 | Hujer et al. | 250/219 FR |
| 3,922,093 | 11/1975 | Dandliker et al. | 356/120 |
| 3,960,451 | 6/1976 | Wirz et al. | 356/161 |
| 4,639,152 | 1/1987 | Yamamoto et al. | 346/76 PH X |
| 4,806,777 | 2/1989 | Ulbers et al. | 250/560 |

FOREIGN PATENT DOCUMENTS

| | | |
|---|---|---|
| 2504199 | 8/1976 | Fed. Rep. of Germany . |
| 3621567 | 1/1987 | Fed. Rep. of Germany . |
| 2110874 | 6/1972 | France . |
| 250850 | 10/1987 | German Democratic Rep. . |
| 60-131260 | 7/1985 | Japan . |
| 60-131264 | 7/1985 | Japan . |
| 60-255462 | 12/1985 | Japan . |
| 60-255464 | 12/1985 | Japan . |
| 1474191 | 5/1977 | United Kingdom . |
| 2177793 | 1/1987 | United Kingdom . |

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A smoothness measuring device for measuring the smoothness of a surface to be measured has a light source for applying a light to the surface to be measured from an oblique direction thereto, a first detector for detecting the quantity light from the light source being reflected by the surface to be measured, a second detector for detecting the quantity of light from the light source being reflected by the surface to be measured, and a judging circuit for judging the smoothness of the surface to be measured on the basis of the results of the first and second detectors.

30 Claims, 15 Drawing Sheets

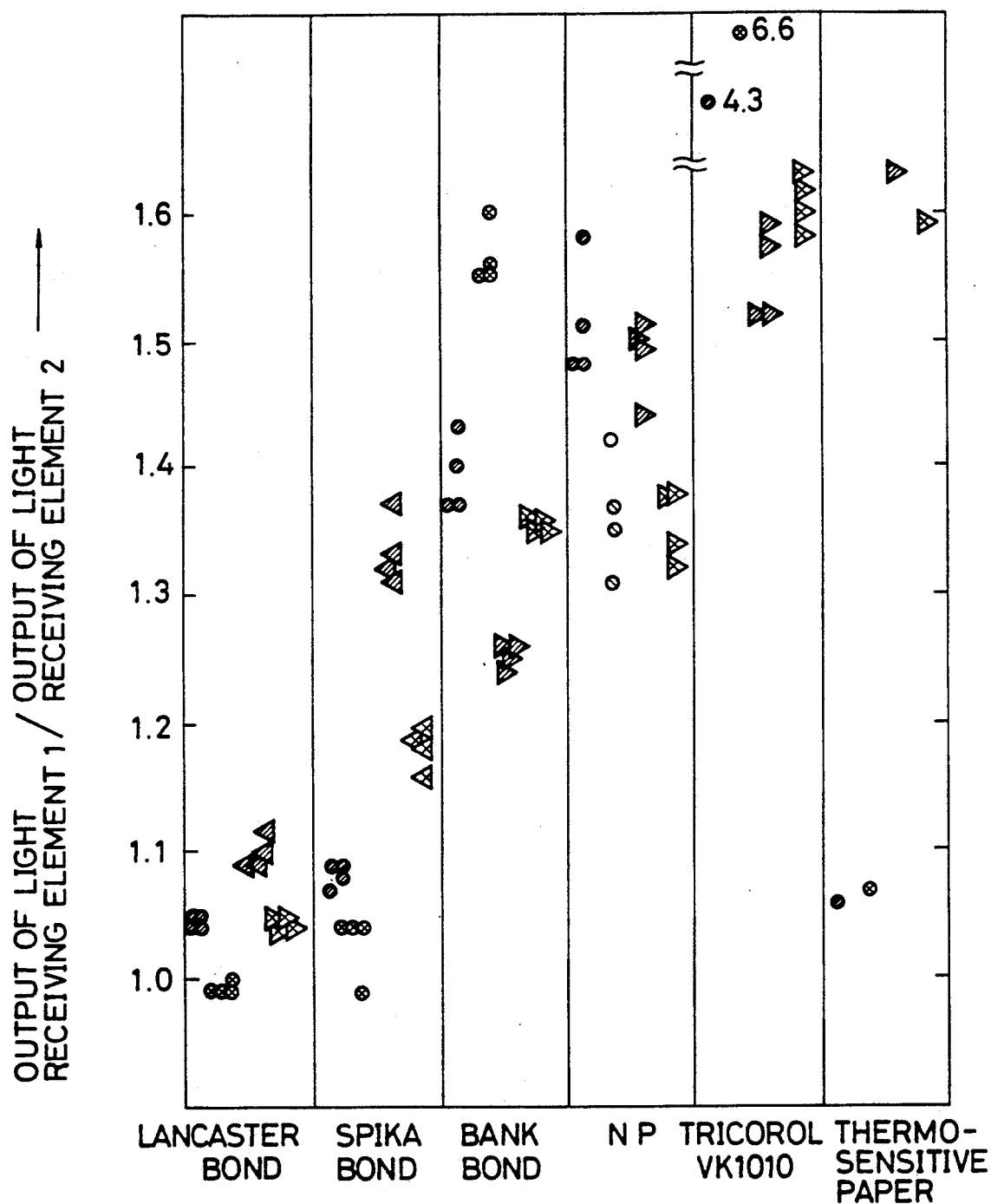

SMOOTHNESS MEASURING DEVICE AND RECORDING APPARATUS TO WHICH THE SMOOTHNESS MEASURING DEVICE IS APPLIED

BACKGROUND OF THE INVENTION

1. Field of the Invention

This invention relates to a smoothness measuring device for measuring the smoothness of a surface to be measured and a recording apparatus to which the smoothness measuring device is applied.

The term "recording apparatus" covers, for example, an electronic typewriter, a copying apparatus, a facsimile apparatus, a printer and the like. Also, as the surface to be measured, mention may be made of recording mediums which include, for example, printing paper, plain paper, worked paper, cloth and plastic sheets for overhead projectors (OHP).

2. Related Background Art

In printing apparatuses (recording apparatuses), particularly, non-impact type printing apparatuses such as heat transfer printers, ink jet printers, light emitting element (LED) printers and bubble jet printers which do not involve pressure fixation, the quality of print and the fixativeness of ink are varied by the smoothness of the printing paper which is a printing medium. So, printing paper of the cotton line such as BOND paper called high quality paper had a tendency that it was generally inferior in the quality of print and fixativeness to plain paper. In addition, such a tendency is also seen more or less in impact type printers, for example, daisy wheels and wire printers.

So, it is known to measure the smoothness of a recording medium, change the recording conditions on the basis of the result of the measurement and improve the quality of recording.

Smoothness test methods heretofore which were widely known as methods of measuring the smoothness of the recording medium include the following methods.

A. Beck Smoothness Measuring Method

The number of seconds required for 100 ml of air to pass between the surface of paper and a glass surface polished into a mirror surface, under a predetermined pressure, is measured.

B. Williams Smoothness Measuring Method

Paper is folded so that the surfaces thereof are opposed to each other, and the "leakage of air" therebetween is measured.

C. Bentsen Smoothness Measuring Method

Low-pressure compressed air is generated by a compact blower, and a constant pressure air of pressure 150 mmHg is sent to between a mirror surface and paper through a constant pressure device and the flow rate thereof is measured.

D. Chapman Smoothness Test Method

The underside of a glass prism is urged against paper and light is sent from the upper surface thereof; irregular reflection occurs in the portion of contact of the prism with the paper.

E. The Contact Needle Meter Method

Paper is scanned by a needle having a small radius tip end and the vertical movement of the needle is recorded.

Methods described below are also known.

Japanese Laid-Open Patent Application No. 60-131260 (filed on Dec. 20, 1983 and laid open on Jul. 12, 1985) describes a construction in which the smoothness of the printing surface of recording paper is measured by a reflection type sensor and a heat generating member is controlled on the basis of the result of the measurement.

Japanese Laid-Open Patent Application No. 60-131264 (filed on Dec. 20, 1983 and laid open on Jul. 12, 1985) describes a construction in which similarly to what has been described above, the smoothness of the printing surface of recording paper is measured by a reflection type sensor and a pressing roller is controlled on the basis of the result of the measurement.

Further, Japanese Laid-Open Patent Application No. 60-255462 (filed on May 31, 1984 and laid open on Dec. 17, 1985) describes a construction in which the degree of roughness of the surface of paper is measured by a smoothness measuring device using the reflectance of light and a detection needle or the like and one or both of the pulse width and the crest value of a printing signal are controlled on the basis of the result of the measurement.

Also, Japanese Laid-Open Patent application No. 60-255464 (filed on Jun. 1, 1984 and laid open on Dec. 17, 1985) describes a construction in which by changing over a switch automatically operated with the smoothness of recording paper measured or operated by the operator in conformity with the quality of the paper used, the speed of movement of a carriage and the heat generation time of a printing head are controlled.

However, the methods shown under items A to E above are structurally large-scale and expensive. So, it is not realistic to incorporate them as smoothness measuring devices in a recording apparatus. Also, the above-mentioned Japanese laid-open patent applications only bear the descriptions of the smoothness measuring method as mentioned above, and do not describe the concrete constructions thereof.

SUMMARY OF THE INVENTION

It is an object of the present invention to provide a compact and simple smoothness measuring device which can measure the smoothness of a recording medium and a recording apparatus to which said smoothness measuring device is applied.

It is another object of the present invention to provide a smoothness measuring device which can improve the measurement accuracy of the smoothness of a recording medium and a recording apparatus to which said smoothness measuring device is applied.

It is still another object of the present invention to provide a smoothness measuring device which can be incorporated into a recording apparatus and a recording apparatus to which said smoothness measuring device is applied.

It is yet still another object of the present invention to provide a compact and simple smoothness measuring device which can improve the measurement accuracy of the smoothness of a surface to be measured It is a further object of the present invention to solve the above-noted problems and to provide, paying attention to the optical characteristic of printing paper, a compact smoothness measuring device which can simply measure the smoothness of printing paper.

It is still a further object of the present invention to provide a smoothness measuring device provided with a light source applying a light beam to printing paper from an oblique direction, a plurality of light recceiving elements for detecting a reflected light reflected upon the printing paper, and judging means for judging the smoothness of the printing paper on the basis of the difference between the quantities of light received by said plurality of light receiving elements.

BRIEF DESCRIPTION OF THE DRAWINGS

FIGS. 6A and 6B show the result of the measurement by an embodiment of the present invention.

DESCRIPTION OF THE PREFERRED EMBODIMENTS

Some specific embodiments of the present invention will hereinafter be described in detail.

Each of the embodiments hereinafter described is provided with means for applying a light to printing paper from an oblique direction, measuring the quantity of light in the direction of main reflection and the quantity of light in the direction of irregular reflection, and comparing the measured values thereof, whereby the smoothness of the printing paper can be recognized relatively simply. That is, attention is paid to the fact that in the case of smooth paper, the quantity of light in the direction of main reflection is very great as compared with the quantity of light in the direction of irregular reflection while, on the other hand, in the case of rough paper, irregular reflection becomes remarkable depending on the degree of roughness of the surface thereof and the quantity of light in the direction of irregular reflection approximates to the quantity of light in the direction of main reflection.

Figure 1:
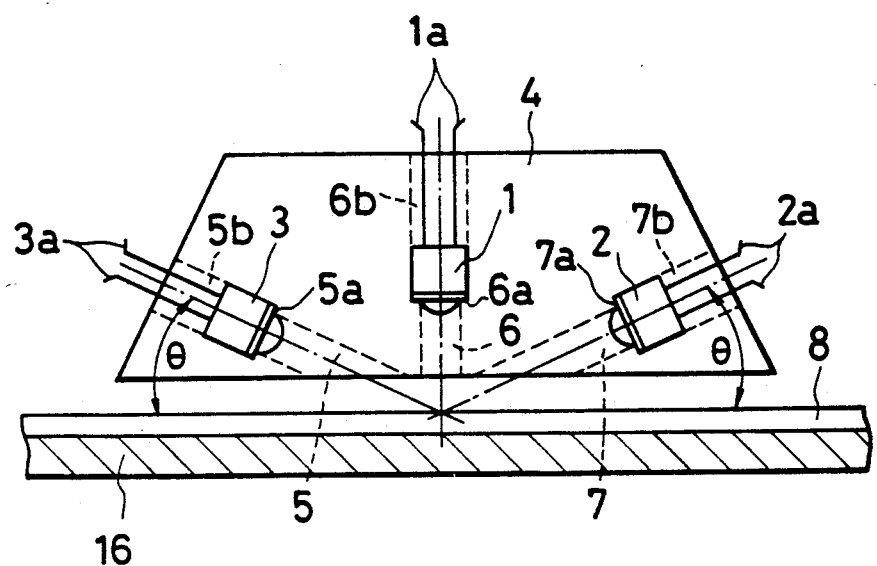
FIG. 1 shows the construction of an embodiment of the present invention.

FIG. 1 shows the construction of a smoothness measuring device S using an embodiment of the present invention. In FIG. 1, the reference numerals 1 and 2 designate light receiving elements. The reference numeral 3 denotes a light source which may suitably be a laser diode or an infrared LED which is relatively high in light output and can provide a light approximate to a parallel light. The reference numeral 4 designates a holder which is a molded article. The holder 4 is formed with through-holes 5, 6 and 7, and the light source 3 and the light receiving elements 1 and 2 are provided in these through-holes 5, 6 and 7, respectively. The through-hole 6 in which the light receiving element 1 is provided is formed vertically in the central portion of the holder 4, and the through-holes 5 and 7 are formed obliquely at the opposite sides of the through-hole 6. Designated by 1a, 2a and 3a are terminals.

Now, the light receiving element 1 receives through the through-hole 6 the quantity of light output from the light source 3, passed through the through-hole 5 and irregularly reflected substantially perpendicularly to printing paper 8. Also, the light receiving element 2 receives the quantity of main reflected light, and is designed to receive the light through the through-hole 7 disposed symmetrically with the through-hole 5 with respect to the normal.

The through-holes 5, 6 and 7 have abutment positions 5a, 6a and 7a, respectively, and the light receiving elements 1, 2 and the light source 3 are adhesively or otherwise fixed to the holder 4 after they are abutted against the abutment positions 5a, 6a and 7a. The printing paper 8 may be wound on a platen (not shown) or the like to prevent its being slack at the measuring position. The light receiving elements 1, 2 and the light source 3 are inserted into enlarged through-holes 5b, 6b and 7b, respectively, formed in the outer peripheral surface of the holder 4 and their fore ends are abutted against the abutment positions 5a, 6a and 7a, respectively, and are positioned thereby, whereafter they are fixed to the holder 4.

The clearance between the holder 4 and the printing paper 8 is maintained at the order of 0.5-1 mm which does not hinder the feeding of the printing paper 8 and is finely adjusted to a position in which the greatest quantity of light is obtained in the direction of main reflection when a mirror-surfaced plate is used instead of the printing paper 8.

Also, the angle of incidence from the light source 3 onto the printing paper 8 and the angle of relfection $\theta$ toward the light receiving element 2 may desirably be 30° or less, and may more desirably be 20°-25°. These angles should preferably be small, but become structurally great and therefore, are suitably determined in conformity with the device. Too great values of these angles would aggravate S/N.

The light receiving elements 1 and 2 are NJL721B (produced by Nippon Musen K.K.). The light source 3 is HL7801E14 (produced by Hitachi Works, Ltd.).

Figure 2A:
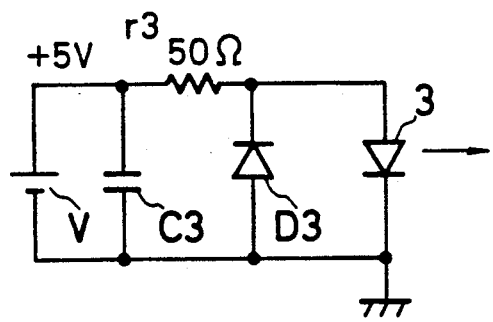
FIGS. 2A, 2B and 2C and FIG. 3 are circuit diagrams showing an embodiment of the present invention.
Figures 2B, 2C:
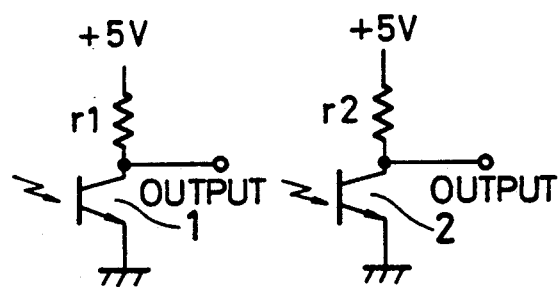

FIGS. 2A-2C are circuit diagrams showing an embodiment of the present invention.

In FIG. 2A, the light source 3 to which a laser diode or the like is applied is connected to a power source +V (in the present embodiment, 5 V) through a current determining resistor r3 (in the present embodiment, 50 $\Omega$), and outputs a light. A capacitor C3 parallel-inserted in the light source 3 is for removing ripples, and a diode D3 is for protecting the light source 3.

Also, in FIGS. 2A and 2B, the light receiving element 1 is for receiving the light in the direction of irregular reflection, and the light receiving element 2 is for receiving the light in the direction of main reflection. The outputs of the light receiving elements 1 and 2 are connected to the power source (in the present embodiment, 5 V) through resistors r1 and r2, respectively. Such values that where the printing paper is heavy bond paper, the outputs of the light receiving elements 1 and 2 assume substantially the same potential are selected as the constants of the resistors r1 and r2 (in the present embodiment, r1 is 2.4 kΩ and r2 is 2.0 kΩ). The reason is for increasing the dynamic range in various kinds of paper from rough paper of low smoothness such as heavy bond paper to smooth paper of high smoothness. Usually, the relation that r1>r2 is established.

When the amount of received light increases, photocurrents i1 and i2 increase and therefore, the outputs of the light receiving elements 1 and 2 approximate to the GND potential (zero potential). Conversely, when the amount of received light decreases, said outputs approximate to the source voltage +V (e.g. +5V).

On the other hand, the outputs of the light receiving elements 1 and 2 are connected also to operational amplifiers 9 and 10, and are impedance-converted, whereafter outputs of the same potential as the outputs of the light receiving elements 1 and 2 are obtained from the operational amplifiers 9 and 10. The outputs of these operational amplifiers 9 and 10 are input to A/D converters 11 and 12, respectively, and the values digitally converted thereby are read by CPU data buses 13 and 14 for controlling the entire printing apparatus (which will be described later). Capacitors C1 and C2 parallel-connected to the light receiving elements 1 and 2 are for removing noise.

Figure 4:
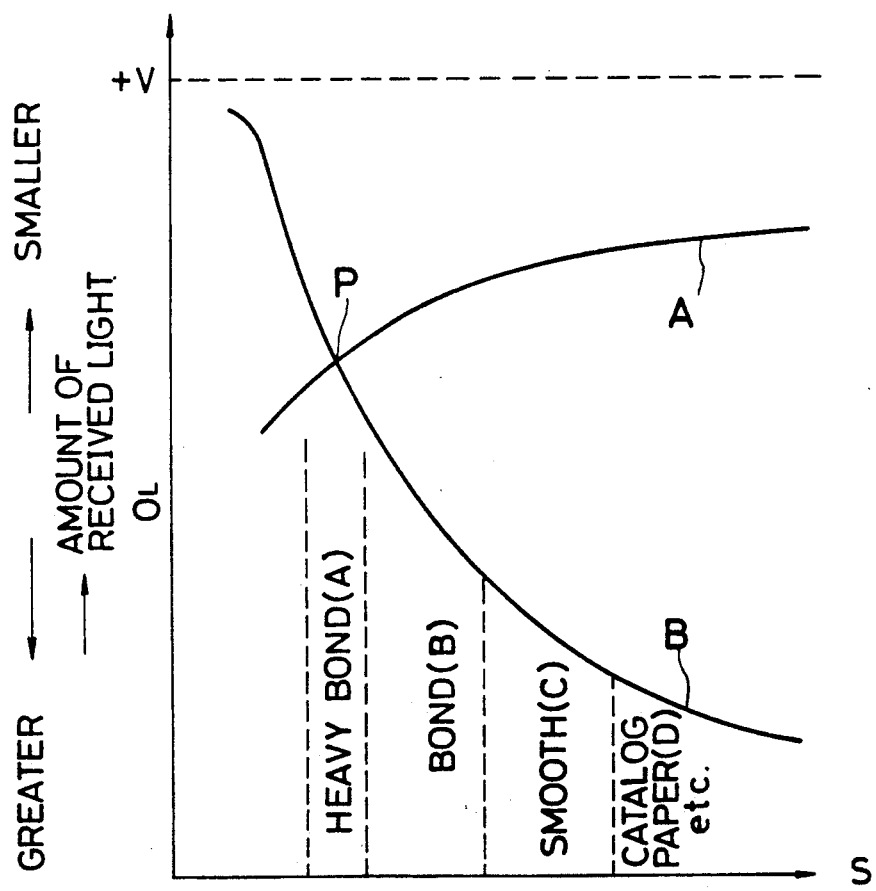
FIG. 4 is a graph shematically showing the outputs of light receiving elements in an embodiment of the present invention.

Further, the output characteristics of the light receiving elements 1 and 2 when the smoothness S of the printing paper is plotted along the X-axis are schematically shown in FIG. 4.

As previously described, the output resistors r1 and r2 are selected so that the outputs $O_L$ of the light receiving elements 1 and 2 assume substantially the same value when the smoothness of heavy bond paper is measured, and the relation that r1>r2 is established.

Accordingly, the point P in FIG. 4 is a point at which the output of the light receiving element 1 (curve A) and the output of the light receiving element 2 (curve B) are coincident with each other, and the amounts of received light thereof are not coincident with each other. The absolute value of the amount of received light at the point P whereat the outputs of the light receiving elements 1 and 2 coincide with each other is usually greater in the light receiving element 2.

As regards the characteristic curves, the higher the light output of the light source 3 shown in FIG. 2A, the smaller values can be selected for the output resistors r1 and r2 of the light receiving elements 1 and 2 and therefore, of course, a variation characteristic appears remarkably.

As shown in FIG. 4, as the difference between the outputs of the light receiving element 1 and the output of the light receiving element 2 becomes greater, it is shown that the smoothness of the surface of the recording paper is higher. That is, as the difference between the output of the light receiving element 1 and the output of the light receiving element 2 becomes greater, there are shown heavy bond paper (A), bond paper (B), smooth paper (C) and catalog paper (D).

Figure 5:
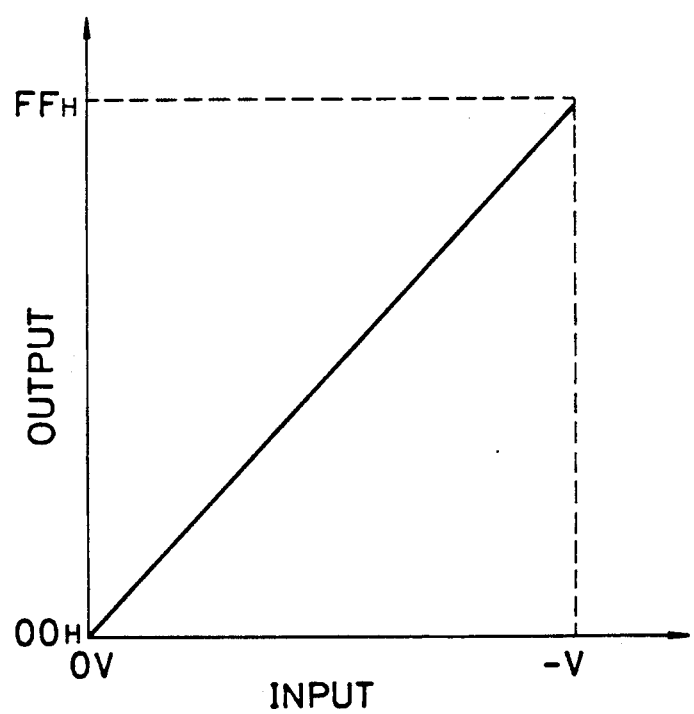
FIG. 5 is a graph showing the input-output characteristics of the A/D converters shown in FIG. 2.

Further, FIG. 5 shows the input-output characteristics of the A/D converters 11 and 12 shown in FIGS. 2A-2C. The output is of 8 bits, and the read value (the output shown in the vertical axis) to the input voltage (shown in the horizontal axis) has a linear characteristic.

Result of the Experiment and Observations

An experiment was carried out with the embodiment shown in FIGS. 1-5 with a view to verify the effect of the present invention. The method of experiment, the result obtained and observations will now be described.

(1) Method of Experiment

Figure 6A:
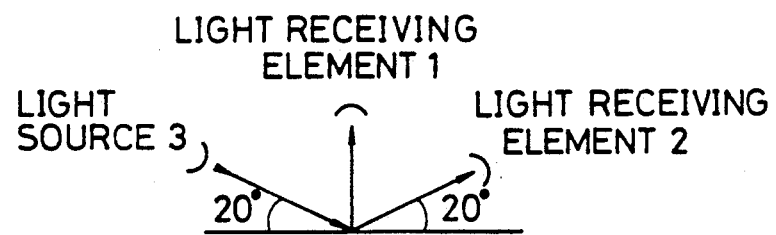

As the light receiving elements 1, 2 and the light source 3, use was made of those shown in FIGS. 2A-2C. The angle $\theta$ was 20° (FIG. 6A). In FIG. 1, the case where the line of intersection between the optical axis plane formed by the light passing through the through-holes 5 and 7 and the paper to be measured is parallel to the lengthwise direction of the paper is "longitudinal measurement", and the case where said line of intersection is parallel to the widthwise direction is "lateral measurement".

(2) Test Paper

LANCESTER BOND PAPER (100% Cotton Fiber Bond) produced by U.S.A. Gilbert Paper Co.
SPIKA BOND PAPER (LIFET16 25% Cotton) produced by LIFE CO.
BANK BOND PAPER produced by Fuji Film Co., Ltd. Canon NP Paper (paper for plain paper copy) produced by Canon, Inc.
Tricorol Paper (VK1010) produced by Canon Sales Thermosensitive Roll Paper (having no surface coating)

(3) Result of the Test

As regards the measurement of smoothness, a sheet of thermosensitive paper and four sheets each of other paper were prepared, and longitudinal and lateral measurements were effected with respect to the front and back of the paper. Measurement was effected with respect to eight locations except a portion of the tricorol paper, and (output (V) of light receiving element 1)/(output (V) of light receiving element 2) was calculated and the average value thereof was found.

FIG. 6A shows the positional relations between the light source and the light receiving elements 1 and 2, and FIG. 6B shows the result of the measurement.

With regard to the tricorol paper, only one result of longitudinal and lateral measurements each was shown in FIG. 6B, but with regard to the result of the longitudinal measurement of the front of the paper, there were obtained 5.7, 4.5 and 3.8 besides it. As regards the result of the lateral measurement, there were obtained 5.5, 4.7 and 4.1 besides it.

(4) Observations of the Result

As will be understood from FIG. 6B, in the present embodiment, paper called heavy bond paper and paper of high smoothness can be clearly distinguished from each other. Further, there is paper whose characteristic is greatly varied by the front and back of the paper and the longitudinal and lateral directions thereof, depending on the shape of the fiber of BOND paper. For example, SPIKA BOND PAPER and BANK BOND PAPER shown in FIG. 6B are so, and this is strongly concerned with the direction of printing by the head of the printing apparatus.

When in a heat transfer printer, printing is actually effected on SPIKA BOND PAPER and BANK BOND PAPER by the use of an ink ribbon having ink of the resin line applied thereto, there appears a difference in the quality of print clearly conforming to the result of the measurement under the same conditions.

Accordingly, if the smoothness measuring means according to the aforedescribed embodiment is applied to a printing apparatus in the future, the smoothness of different papers can be accurately discriminated not always by the printing process for the different kind of the paper, but by whether even in papers of the same kind, the printing surface is the front of the paper and the direction of printing is the longitudinal direction or the lateral direction relative to the paper, and thereby by reflecting the result of the discrimination in the printing process, there can be automatically obtained a homogeneous and beautiful quality of print.

It is considered that about four stages of discrimination are stably obtained from the result of the aforedescribed experiment. Also, the front side of the tricorol paper (VK1010) exhibits a great value approximate to mirror surface reflection. The reason is that the tricorol paper is paper developed so that homogeneous printing may be obtained even in a heat transfer printer using an ink ribbon of the wax line, and only the printing surface (the front side) thereof is coating-processed and therefore, a great value (more approximate to a mirror surface) is obtained as shown in the result of the experiment.

In the present experiment, measurement of thermosensitive roll paper was also effected, and with regard to the front side thereof, there was obtained an average value as low as 1.05. The reason is presumably that the front side of thermosensitive paper is calendered after numberless particles such as a color former, a developer, a binder and an interface activator are applied thereto, but the thermosensitive roll paper used in the present experiment was of the type which was not coated, and therefore an output ratio of the same degree as that of heavy bond paper was obtained by the irregular reflection of the numberless particles. That is, this is a characteristic similar to "delustering coating". Speaking for caution's sake, the present embodiment does not intend, in principle, to discriminate even the height and depth of the unevenness of the surface of paper. Accordingly, with regard to paper subjected to the "delustering coating", care should be taken of the result of the measurement thereof. However, the present embodiment is not always unable to measure the smoothness of paper subjected to the "delustering coating".

Figure 7:
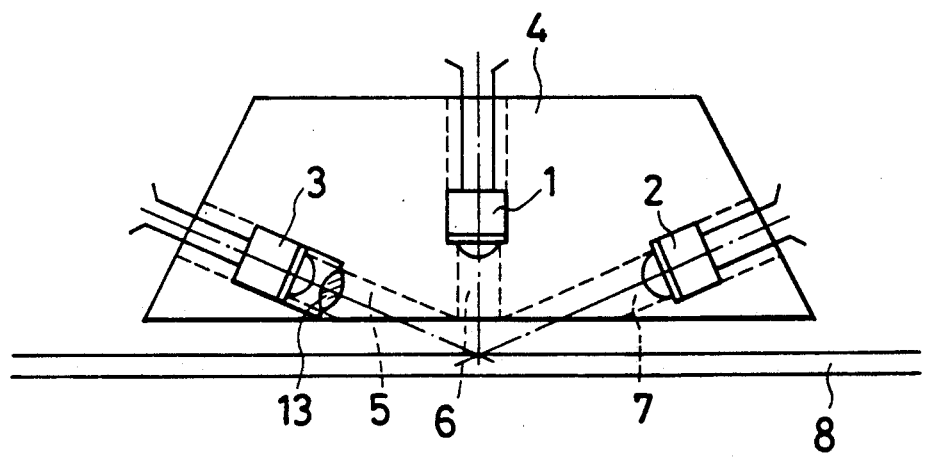
FIG. 7 shows the construction of another embodiment of the present invention.

FIG. 7 shows another embodiment of the present invention. In FIG. 7, portions given the reference numerals 1 to 8 are similar to those in FIG. 1, but a condensing lens 13 is added. The condensing lens 13 is integral with the light source 3. The condensing lens 13 is endowed with the function of collimating the light beam of the light source, and if the light beam is caught from the light receiving elements 1, 2 side, a great absolute value of the quantity of light can be secured and therefore, where a high light output of the light source 3 cannot be secured, this method is suitable. As a light source with a lens, there is available, for example, NJL1121B (produced by JRC) using an infrared LED, and an additional experiment was carried out by a similar measuring system with a result that it could be confirmed that measurement accuracy substantially approximate to that when a laser source was used was obtained.

Figure 3:
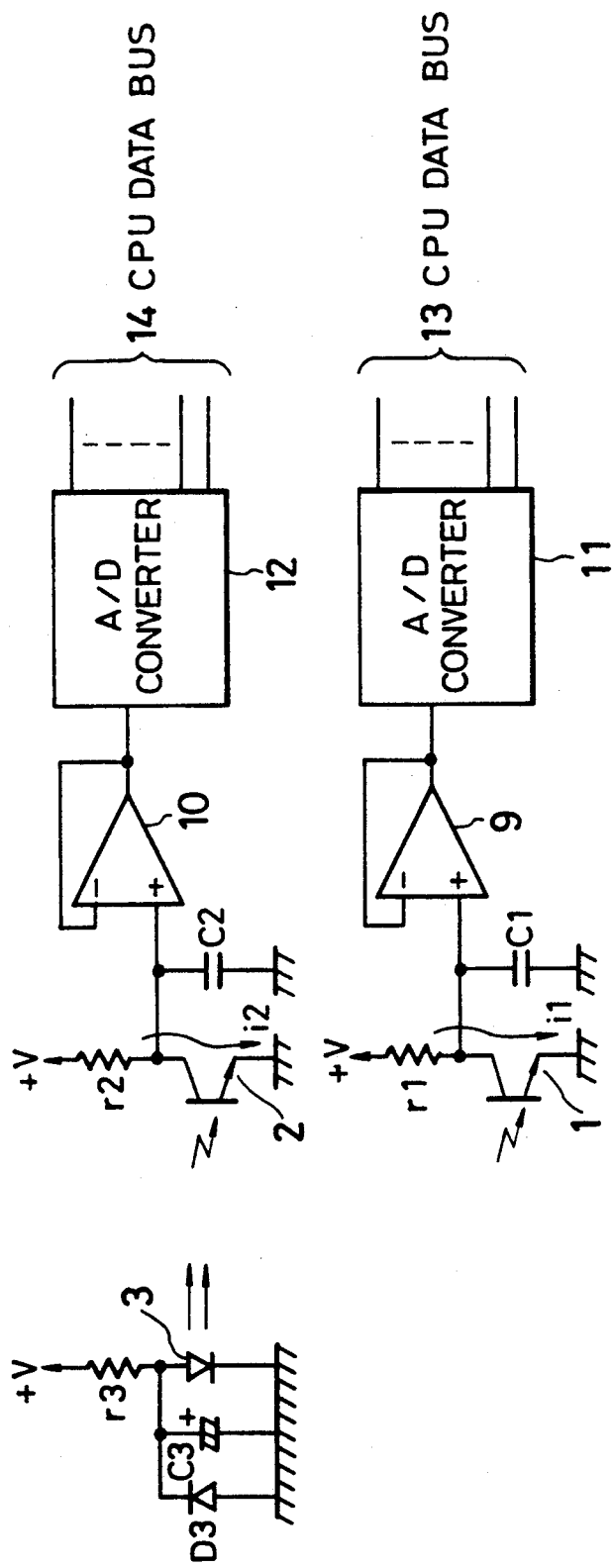
Figure 8:
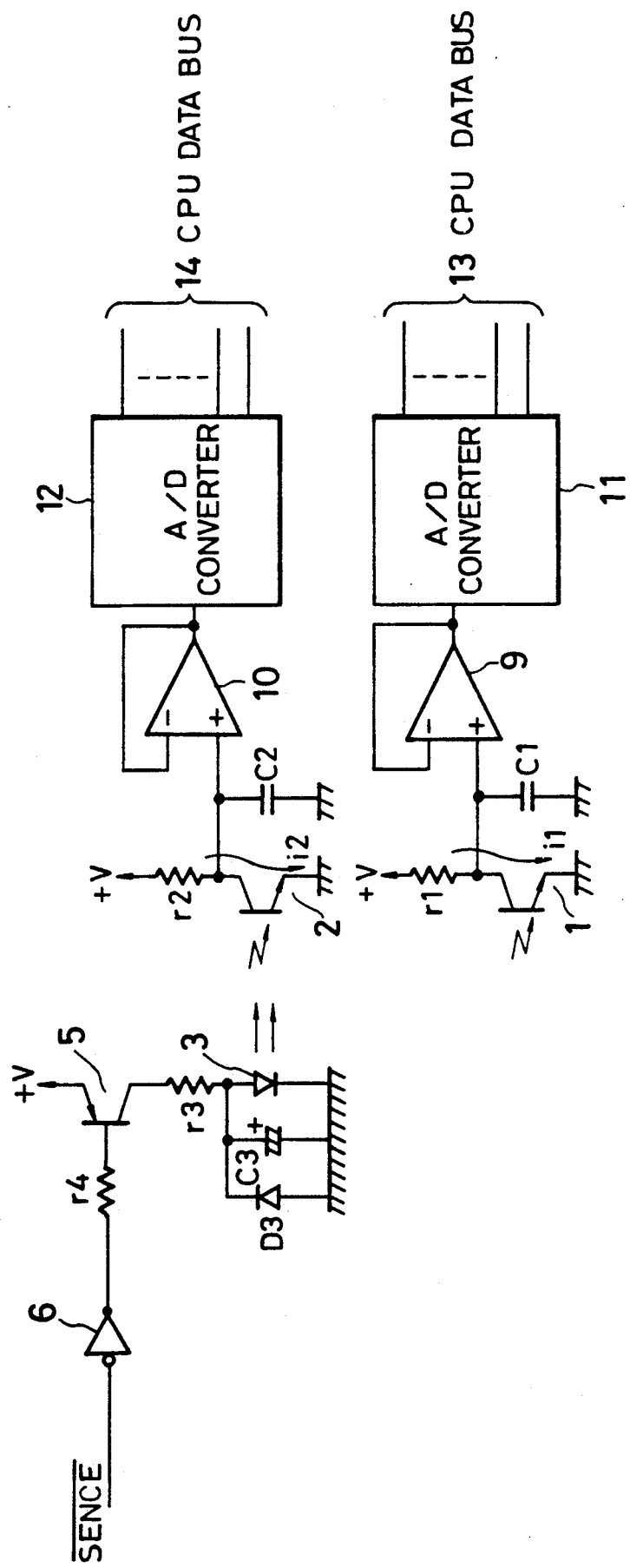
FIGS. 8 and 9 are circuit diagrams showing further embodiments of the present invention.

FIG. 8 shows an embodiment in which a transistor 5, which is a switching means, is further added to the light source 3. In FIG. 8, portions similar to those in FIG. 3 are given similar reference numerals. According to the present embodiment, before paper is measured, "0" is set from a CPU into an output port $\overline{\text{SENCE}}$, and if the transistor 5 is turned on through an open collector buffer 6 and a resistor r4, the light source 3 is operated, and if "1" is set in the output port $\overline{\text{SENCE}}$ after the completion of the measurement, the light source 3 stops outputting.

According to this method, deterioration of the light output of the light source is hardly conceivable and therefore, any compensation for the variation with time need not be considered. This is a means particularly effective for a printing apparatus driven by a battery.

Figure 9:
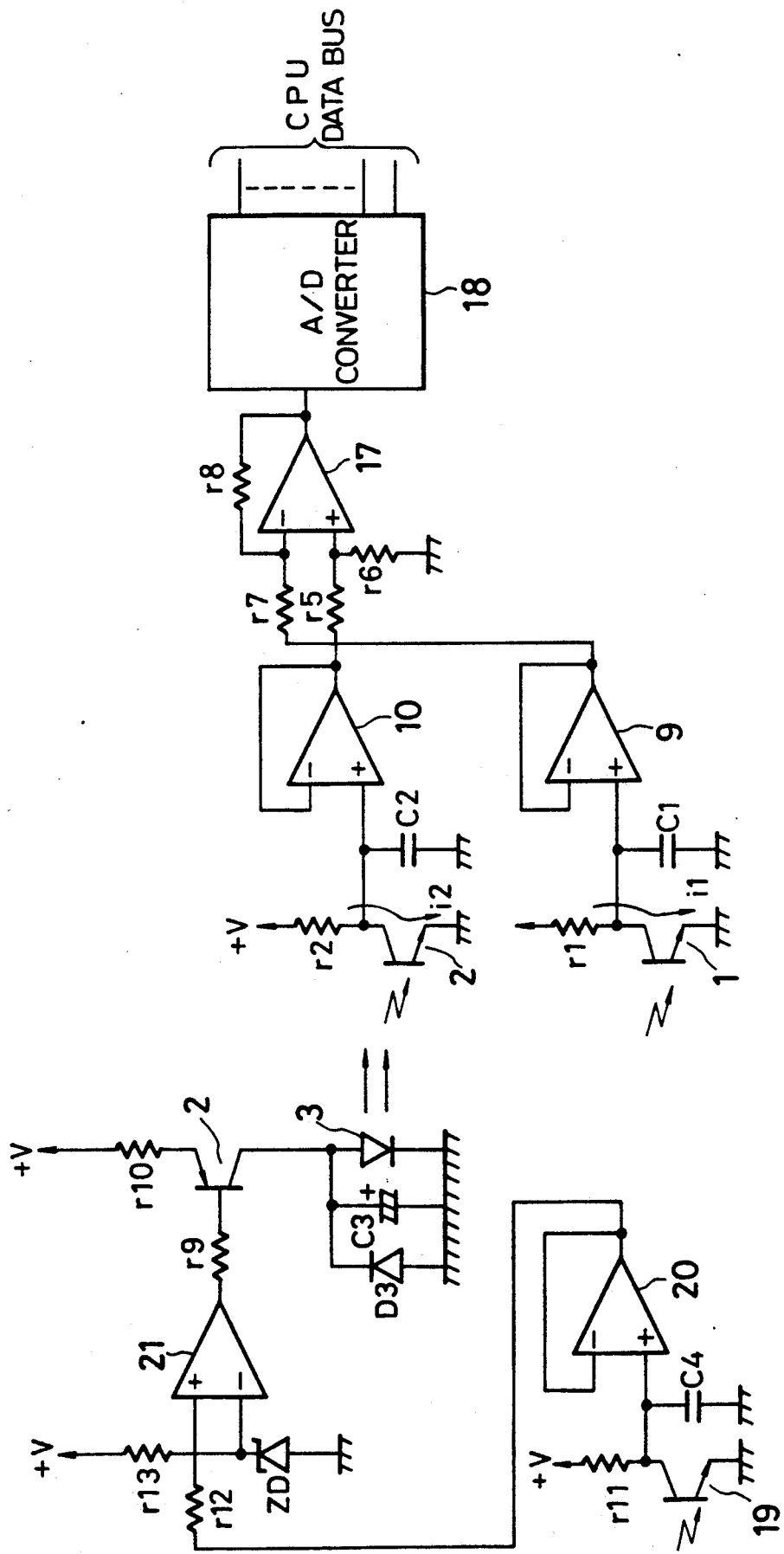

Still another embodiment of the present invention is shown in FIG. 9.

Figure 10:
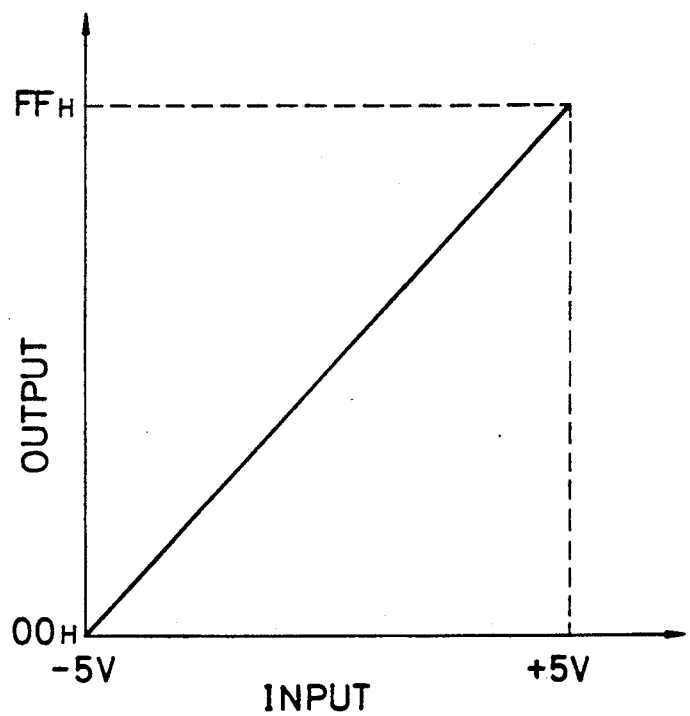
FIG. 10 is a graph showing the input-output characteristic of the A/D converter shown in FIG. 8.

In the embodiment of FIG. 9, the differential amplified value of the light receiving elements 1 and 2 is used as input means and the outputs of operational amplifiers 9 and 10 are similar to those in the embodiment shown in FIGS. 2A-2C. The outputs from the operational amplifiers 9 and 10 are connected to the minus input and the plus input of an operational amplifier 17 through resistors r7 and r5, respectively. The output from the operational amplifier 17 is represented by [(output of operational amplifier 10)—(output of operational amplifier 9)]. Here, r7=r5 and r6=r8. That is, in the case of FIG. 9, the differentially amplified value of the output voltages of the light receiving elements 1 and 2 is input to an A/D converter 18. Accordingly, the output value from the operational amplifier 17 sometimes becomes negative in polarity, and the output value of the A/D converter 18, as shown in FIG. 10, assumes, for example, a converted value OOH when the input is −5 V, and a converted value FFH when the input is +5 V.

In this method, the absolute values of the outputs from the light receiving elements 1 and 2 are important and therefore, a light output correcting circuit for the light source 3 shown in FIG. 9 becomes necessary. The reference numeral 19 designates a light receiving element exclusively for monitoring the light output of the light source 3, and the output thereof is connected to a power source +V through a resistor r11. On the other hand, the output of the light receiving element 19 is connected to the plus input of an operational amplifier 20, and after the conversion of the impedance, a voltage value of the same level as the output of the light receiving element 19 is output from the operational amplifier 20. A capacitor C4 parallel-connected to the light receiving element 19 is for removing noise.

Here, the output from the operational amplifier 20 is connected to the plus input of an operational amplifier 21 through a resistor r12 while, on the other hand, the minus input of the operational amplifier 21 is fixed at a predetermined voltage by a Zener diode ZD. Therefore, the operational amplifier 21 controls a transistor 22 through resistor r9 and r10 and controls the output of the light source 3 so that the output of the light receiving element 19 may always assume a predetermined output value determined by the Zener diode ZD.

As described above, in the present embodiment, the smoothness of printing paper can be discriminated relatively simply in the printing apparatus and therefore, by changing the various conditions mentioned hereinafter in conformity with the result of the discrimination, the following effects can be expected.

(1) Impact Printer Such as a Daisy Wheel

Improvement in quality of printing . . . By providing a setting mode for automatically changing the printing impact pressure in conformity with the result of the discrimination of the smoothness, a reduction in impact marks and homogenization of the quality of printing by paper can be achieved. Also, by providing a setting mode for automatically changing the amount of feed of a multistrike type ribbon in conformity with the result of the discrimination of the smoothness, the quality of printing can be improved.

Improvement in erasability . . . By automatically setting the frequency of erasing impact in comformity with the result of the discrimination of the smoothness, a reduction in impact marks and an improvement in erasability can be achieved.

(2) Heat Transfer Printer

Improvement in quality of printing . . . By automatically setting heat energy, printing speed, minimum printing unit, peeling-off angle, head pressure, ribbon tension, etc. in conformity with the result of the discrimination of the smoothness, homogenization of the quality of printing can be achieved.

Improvement in erasability . . . By automatically setting erasing energy and the frequency of erasing scan in conformity with the result of the discrimination of the smoothness, an improvement in erasability can be achieved.

(3) Ink Jet/Bubble Jet Printer

Improvement in quality of printing . . . By automatically setting the amount of ink discharged, printing speed, minimum printing unit, the clearance between the paper and the head, ink fixating temperature and time in conformity with the result of the discrimination of the smoothness, homogenization of the quality of printing can be achieved.

(4) Laser Beam/Light Emitting Element LED/Liquid Crystal Printer

Improvement in quality of printing . . . By automatically setting the output of the printing light source, printing speed, minimum printing unit, the pressure of the pressure fixating portion, the amount of toner supplied, etc. in conformity with the result of the discrimination of the smoothness, an improvement in quality of printing can be achieved.

Description will now be made of an embodiment in which the aforedescribed smoothness measuring device S is applied to an electronic typewriter using the heat transfer recording system.

Figure 11:
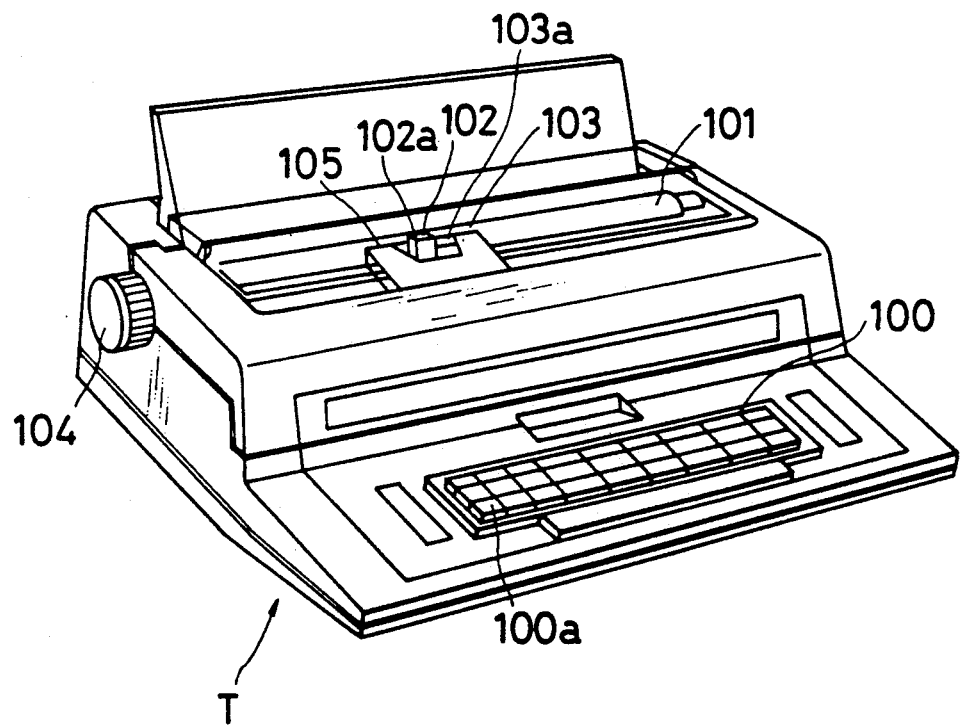
FIG. 11 is a pictorial perspective view of an electronic typewriter of the heat transfer recording type provided with a smoothness measuring device to which an embodiment of the present invention is applied.
Figure 12:
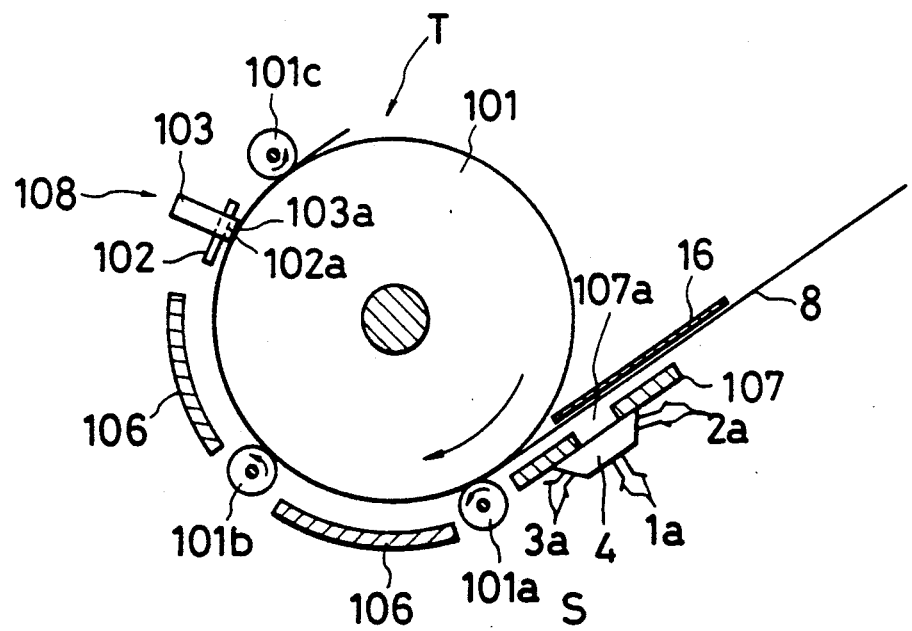
FIG. 12 is a partly cross-sectional view showing said smoothness measuring device as it is actually mounted in the electronic typewriter shown in FIG. 11.
Figure 13:
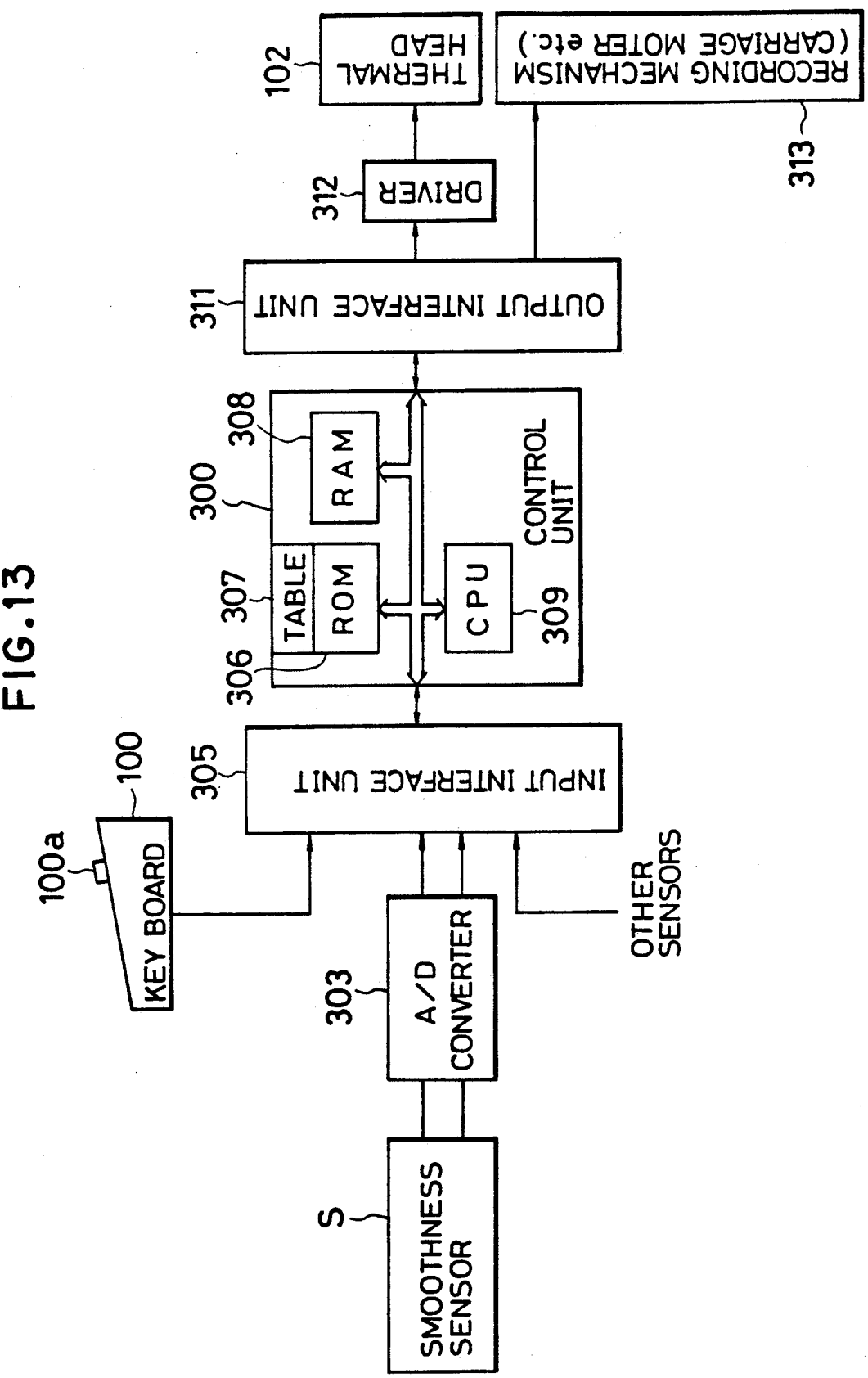
FIG. 13 is a block diagram showing the construction of said typewriter.
Figure 14:
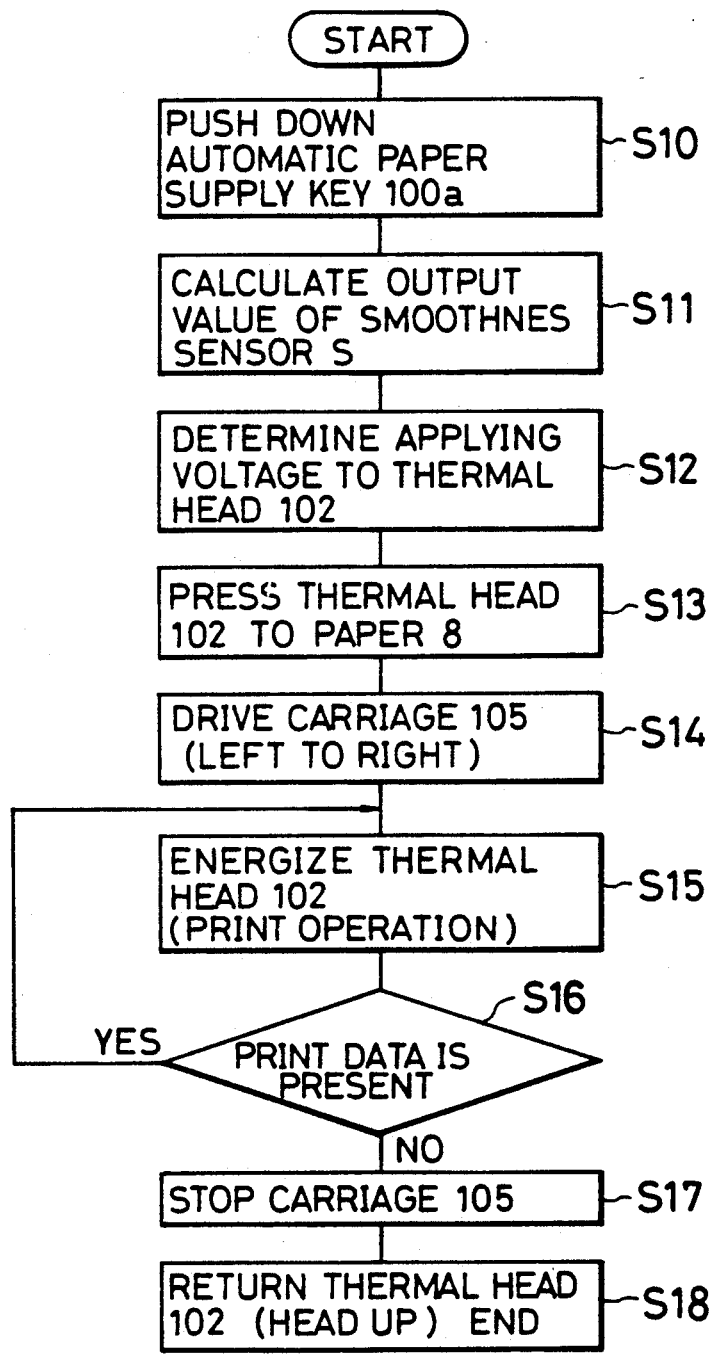
FIG. 14 is an operation flow chart of the electronic typewriter shown in FIG. 11.
Figure 15:
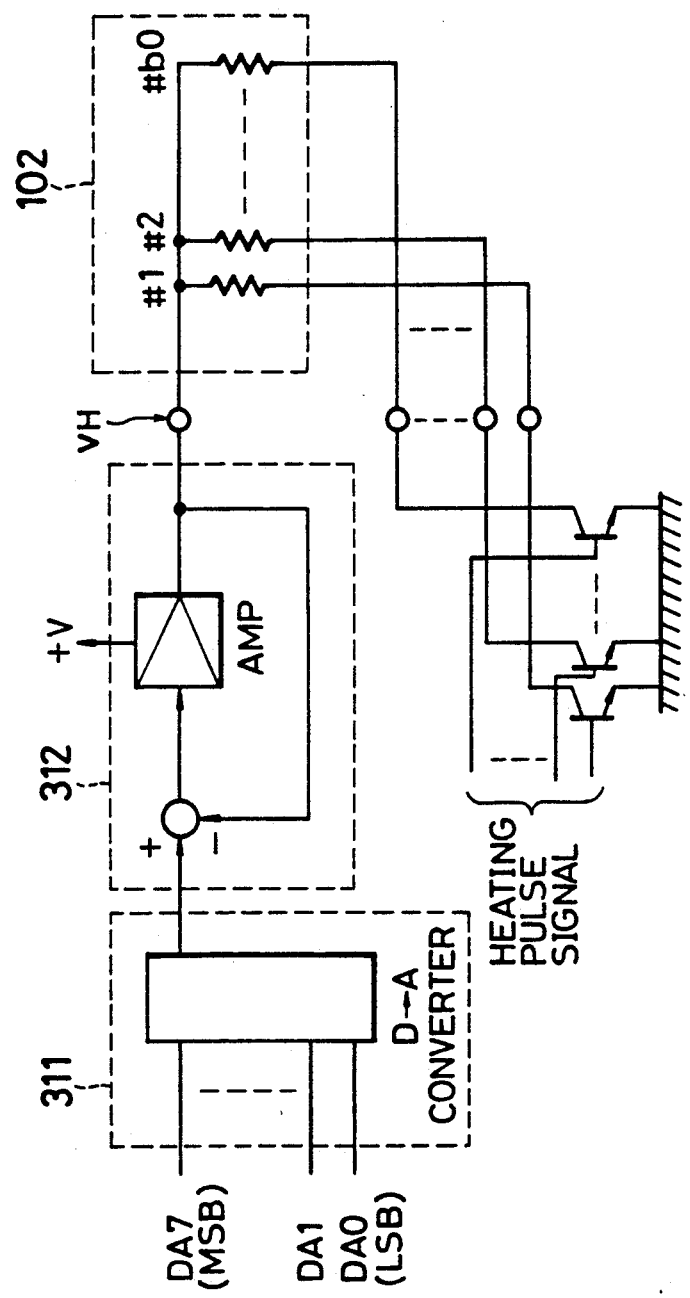
FIG. 15 is a partially enlarged diagram of the block diagram shown in FIG. 13.

FIG. 11 is a pictorial perspective view of an electronic typewriter T of the heat transer recording type provided with the aforedescribed smoothness measuring device S, FIG. 12 is a partly cross-sectional view showing the aforedescribed smoothness measuring device S as it is actually mounted in the typewriter T, FIG. 13 is a block diagram showing the construction of the typewriter T, FIG. 14 is an operation flow chart of the electronic typewriter shown in FIG. 11, and FIG. 15 is a partially enlarged diagram of the block diagram shown in FIG. 13.

In FIG. 11, the reference numeral 100 designates a keyboard provided with keys for inputting information. The reference numeral 101 denotes a platen roller for maintaining the recording paper 8 at a predetermined position during recording and for conveying the recording paper 8. The reference numeral 102 designates a thermal head having a plurality of heat generating members 102a which selectively generate heat in conformity with image information. The reference numeral 103 denotes an ink ribbon cassette containing therein an ink ribbon 103a having ink applied thereto. Even in a case where recording paper of low surface smoothness is used, in order that a good transfer image may be obtained, it is preferable to use as the ink ribbon an ink ribbon having applied thereto heat-transferable ink composed chiefly of resin of relatively high melting viscosity. Hence, the thermal head 102 and the ink ribbon cassette 103 are carried on a carriage 105 and are reciprocally movable along the platen roller 101. Thus, during image recording, the ink ribbon 103a is paid away in response to the movement of the carriage 105, the thermal head 102 adapted to generate heat in conformity with image information heats the ink ribbon 103a thus paid away, and the ink is transferred to the recording paper, whereby image recording is accomplished. Designated by 104 is manually operated knob for the operator to manually rotate the platen roller 101.

The actually mounted state of the smoothness measuring device S with respect to said typewriter T will now be described with reference to FIG. 12. In FIG. 12, the reference numeral 101 designates the aforementioned platen roller, and pinch rollers 101a, 101b and 101c are urged against the roller 101. The pinch rollers 101a and 101b are paper feeding rollers for holding the recording paper 8 so as not to separate from the platen roller 101, and the pinch roller 101c is a discharge roller. The reference numeral 16 denotes a guide for guiding the recording paper 8 so as to be along the platen roller 101. The aforementioned guide 16 is disposed upstream of the platen roller 101 with respect to the direction of conveyance of the recording paper 8. An entrance side guide 107 is provided in opposed relationship with the guide 16. The aforementioned smoothness sensor S for measuring the smoothness of the recording paper 8 is provided in an opening 107a in the guide 107. So, according to the present embodiment, the smoothness of the recording paper 8 can be measured with the flatness of the recording paper maintained by the recording paper being guided by the guide 16 and the smoothness is measured upstream of the recording unit 108 and therefore, the recording conditions can be changed on the basis of the result of the measurement. The recording unit 108 in which the thermal head 102, the ink ribbon cassette 103, etc. (the carriage 105 being not shown) are disposed is provided upstream of the discharge roller 101c with respect to the direction of conveyance of the recording paper 8.

Now, the aforedescribed smoothness sensor S applies a light to the recording paper 8 as previously described, and outputs the aforementioned two voltage signals responding to the smoothness of the recording surface of the recording paper 8 on the basis of the intensity of the reflected light from the recording paper. Then, as shown in FIG. 13, the output voltage values from the sensor S are converted into digital signals by an A/D converter 303. The output voltage values of the A/D converter 303 are introduced and stored into RAM 308 under the control of CPU 309 through an input interface unit 305.

The CPU 309, as shown in the flow chart of FIG. 14, takes thereinto the input information from the keyboard 100, the A/D converter 303, etc. in accordance with a program stored in ROM 306, and temporarily stores it in the RAM 308. The CPU 309 then outputs control information to a driver 312 through an output interface unit 311 on the basis of this information and data prestored in the ROM 306. Also, the CPU 309 drives a recording mechanism unit 313 and executes various controls for executing serial recording.

The recording density adjustment to the recording paper 8 based on the result of the measurement by the sensor S will further be described in detail. The CPU 309 determines the energizing voltage or the like to the heat generating members 102a of the thermal head 102 conforming to the set energy value of the heat generating members 102a with reference to a table 307 on the basis of the energy information of the heat generating members 102a stored in the RAM 308, such as, for example, the average resistance value of the heat generating members 102a. Then, it outputs control information to the driver 312 through the output interface unit 311.

During the recording operation, the driver 312 supplies a set voltage to the heat generating member 102a on the thermal head 102 to thereby effect recording.

The set energy value of the heat generating members 102a based on the result of the calculation of each output of the smoothness sensor S renders the applied voltage to the thermal head 102 higher as shown in FIG. 14 when the surface of the recording paper 8 is rough. On the other hand, where recording paper 8 having a smooth surface is used, the value of the table 307 of the ROM 306 is selected so that the applied voltage to the thermal head 102 becomes lower, whereby control is effected.

Now, FIG. 14 is a flow chart showing the printing operation in the electronic typewriter T to which the present invention is applied.

When the automatic paper supply key 100a of the keyboard 100 is depressed at step S10, the recording paper 8 is set at the recording position as shown in FIG. 13. At step S11, the smoothness of the recording paper 8 is recognized on the basis of the result of the calculation of each output of the smoothness sensor S. At step S12, on the basis of that result, the recording density, i.e., the applied voltage to the thermal head 102, is determined with reference to the table 307. At step S13, the thermal head 102 is pressed against the recording paper 8 with the ink ribbon 103a interposed therebetween. Subsequently, at step S14, the driving of the carriage 105 carrying thereon the thermal head 102 and the ink ribbon cassette 103 is started, and at step S15, the print data and the driving voltage (or the driving time or the driving current) of the thermal head 102 set at the step S12 are output to the driver 312 to thereby electrically energize the thermal head 102, thus executing the recording operation.

When the recording of one character or one line is thus completed, advance is made to step S17, where the rotation of the carrier motor or the like of the recording mechanism is stopped. At step S18, the thermal head 102 is brought up and is released from the state in which it is pressed against the platen roller 101, whereupon the recording operation is terminated.

Now, FIG. 15 shows the driver 312 as it is expressed by a differential amplification type amplifier from the D/A converter 311a of the output interface unit 311 shown in FIG. 13 which is concerned in the thermal head 102, and is an enlarged diagram when the thermal head 102 has heat generating members 102a corresponding to 60 dots.

Here, the input-output of the D/A converter 311a is generally set to

00H→0 V
01H→0.1 V
. . .
. . .
. . .
FFH→25.6 V and therefore, at 0.1 [0] step, the head voltage VH can be set.

Accordingly, when the applied voltage VH to the thermal head 102 is determined from the output ratio of the light receiving elements 1 and 2 obtained at the steps S11 and S12 in the flow chart shown in FIG. 14, for example, with the values shown in Table 1 below as reference, if the reflection method shown in FIG. 15 is followed, a more appropriate recording density can be automatically obtained on the basis of the result of the measurement of the smoothness of the recording paper 8.

As is apparent from Table 1, when the result of the measurement by the sensor S is $V_1, V_2 \geq 3.5$ V, an alarm such as flashing of a lamp is produced with it being judged that jam has occurred to the recording paper 8 in the course of conveyance or the recording paper 8 has become exhausted.

TABLE 1

| $\delta = V_1/V_2$ | Input value of D/A converter 311a | VH:Head |
|---|---|---|
| $\delta < 1.2$ | B0(H) | 17.6[V] |
| $1.2 \leq \delta < 1.3$ | A8(H) | 16.8[V] |
| $1.3 \leq \delta < 2.0$ | A0(H) | 16[V] |
| $2.0 \leq \delta$ | 98(H) | 15.2[V] |
| $V_1, V_2 \geq 3.5$ V | Recording Paper Empty → Alarm | |

As described above, according to the present invention, there can be provided a smoothness measuring device which can accurately measure the smoothness of a surface to be measured by a simple construction and a recording apparatus to which said smoothness measuring device is applied.

We claim:

1. A smoothness measuring device for measuring the smoothness of a surface to be measured, said device comprising:
    a light source for applying a light onto the surface to be measured from an oblique direction;
    first detecting means for detecting a quantity of light from said light source reflected in a main reflection direction by the surface to be measured;
    second detecting means for detecting a quantity of light from said light source reflected in an irregular reflection direction by the surface to be measured; and
    judging means for judging the smoothness of the surface to be measured on the basis of detection results of said first detecting means and said second detecting means.

2. A smoothness measuring device according to claim 1, wherein said judging means is connected to a light receiving element and includes an operational amplifier for obtaining an output of the same potential as the output of said light receiving element, and an A/D converter for digitally converting the output of said operational amplifier.

3. A smoothness measuring device according to claim 1, wherein said first and second detecting means each have a light receiving element parallel-connected to a capacitor.

4. A smoothness measuring device according to claim 1, wherein said first and second detecting means each have a light receiving element, the output of which is connected to a power source through a resistor.

5. A smoothness measuring device according to claim 4, wherein when the quantity of light received by one of said light receiving elements increases, the output of said light receiving element approximates GND potential, and when conversely the quantity of light received by said light receiving element decreases, the output of said light receiving element approximates a power source voltage.

6. A smoothness measuring device according to claim 1, wherein the main reflection direction is disposed at an angle relative to the surface to be measured equal to the angle of the oblique direction relative to the surface, and the irregular reflection direction is disposed at an angle relative to the surface different from the angle of the oblique direction relative to the surface.

7. A smoothness measuring device according to claim 6, wherein the irregular reflection direction is perpendicular to the surface to be measured.

8. A recording apparatus for effecting recording on a recording medium, said apparatus comprising:
 recording means for effecting recording on the recording medium;
 conveying means for conveying the recording medium;
 a smoothness sensor provided with a light source for applying light onto the recording medium from an oblique direction, first detecting means for detecting a quantity of light from said light source reflected in a main reflection direction by the recording medium, second detecting means for detecting a quantity of light from said light source reflected in an irregular reflection direction by the recording medium, and judging means for judging the smoothness of the recording medium on the basis of detection results of said first detecting means and said second detecting means; and
 control means for changing recording conditions of said recording means on the basis of a result of the judgment by said smoothness sensor.

9. A recording apparatus according to claim 8, wherein said smoothness sensor is positioned in an opposing relationship with an opening formed in a conveyance guide for the recording medium.

10. A recording apparatus according to claim 8, wherein said judging means is connected to a light receiving element and includes an operational amplifier for obtaining an output of the same potential as the output of said light receiving element, and an A/D converter for digitally converting the output of said operational amplifier.

11. A recording apparatus according to claim 8, wherein said first and second detecting means each have a light receiving element parallel-connected to a capacitor.

12. A recording apparatus according to claim 8, wherein said first and second detecting means each have a light receiving element, the output of which is connected to a power source through a resistor.

13. A recording apparatus according to claim 12, wherein when the quantity of light received by one of said light receiving elements increases, the output of said light receiving element approximates GND potential, and when conversely the quantity of light received by said light receiving element decreases, the output of said light receiving element approximates a power source voltage.

14. A recording apparatus according to claim 8, wherein the main reflection direction is disposed at an angle relative to the surface to be measured equal to the angle of the oblique direction relative to the surface, and the irregular reflection direction si disposed at an angle relative to the surface different from the angle of the oblique direction relative to the surface.

15. A recording apparatus according to claim 14, wherein the irregular reflection direction is perpendicular to the surface to be measured.

16. A smoothness measuring device for measuring the smoothness of a surface of a recording medium said device comprising:
 a light source for applying light onto the recording medium from an oblique direction;
 a first light receiving element for receiving light from said light source reflected in a main reflection direction by the surface of the recording medium;
 a second light receiving element for receiving light from said light source reflected in an irregular reflection direction by the surface of the recording medium; and
 means for digitally converting outputs from said first and said second light receiving elements, the outputs being produced corresponding to the received quantities of reflected light.

17. A smoothness measuring device according to claim 16, further comprising judging means connected to said light receiving elements including an operational amplifier for obtaining an output of the same potential as the output of said light receiving elements, and an A/D converter for digitally converting the output of said operational amplifier.

18. A smoothness measuring device according to claim 16, wherein said first and second light receiving elements are each parallel-connected to a capacitor.

19. A smoothness measuring device according to claim 16, wherein the outputs of said first and second light receiving elements are each connected to a power source through a resistor.

20. A smoothness measuring device according to claim 16, wherein the main reflection direction is disposed at an angle relative to the surface of the recording medium equal to the angle of the oblique direction relative to the surface, and the irregular reflection direction is disposed at an angle relative to the surface different from the angle of the oblique direction relative to the surface.

21. A smoothness measuring device according to claim 20, wherein the irregular reflection direction is perpendicular to the surface of the recording medium.

22. A recording apparatus for effecting recording on a recording medium by the use of an ink sheet, said apparatus comprising:
 a thermal head for heating said ink sheet to effect recording on the recording medium;
 conveying means for conveying the recording medium;
 a smoothness sensor provided with a light source for applying alight onto the recording medium from an oblique direction, a first light receiving element for receiving light from said light source reflected in a main reflection direction by a surface of the recording medium, a second light receiving element for receiving light from said light source reflected in an irregular reflection direction by the surface of the recording medium, and means for digitally converting outputs from said first and said second light receiving elements, the outputs being produced corresponding to received quantities of reflected light; and control means for controlling electric power applied to said thermal head to cause said thermal head to generate heat on the basis of a signal from said digitally converting means.

23. A recording apparatus according to claim 22, further comprising judging means connected to said light receiving elements including an operational amplifier for obtaining an output of the same potential as the output of said light receiving elements, and an A/D converter for digitally converting the output of said operational amplifier.

24. A recording apparatus according to claim 22, wherein said first and second light receiving elements are each parallel-connected to a capacitor.

25. A recording apparatus according to claim 22, wherein the outputs of said first and second light receiving elements are each connected to a power source through a resistor.

26. A recording apparatus according to claim 22, wherein the main reflection direction is disposed at an angle relative to the surface of the recording medium equal to the angle of the oblique direction relative to the surface, and the irregular reflection direction is disposed at an angle relative to the surface different from the angle of the oblique direction relative to the surface.

27. A recording apparatus according to claim 26, wherein the irregular reflection direction is perpendicular to the surface of the recording medium.

28. A smoothness measuring device comprising:

a light source for applying a light beam onto a printing paper from an oblique direction;

a plurality of light receiving elements for detecting quantities of light reflected by the printing paper, at least one of said light receiving elements for detecting a quantity of light reflected in a main reflection direction by the printing paper and at least one other of said light receiving elements for detecting light reflected in a scattered reflection direction by the printing paper; and judging means for judging the smoothness of the printing paper on the basis of the difference between the quantitites of light detected by said plurality of light receiving elements.

29. A smoothness measuring device according to claim 28, wherein the main reflection direction is disposed at an angle relative to a surface of the printing paper equal to the angle of the oblique direction relative to the surface, and the scattered reflection direction is disposed at an angle relative to the surface different from the angle of the oblique direction relative to the surface.

30. A smoothness measuring device according to claim 29, wherein the scattered reflection direction is perpendicular to the surface of the printing paper.

* * * * *

UNITED STATES PATENT AND TRADEMARK OFFICE
CERTIFICATE OF CORRECTION

PATENT NO. : 5,109,236

DATED : April 28, 1992

INVENTOR(S) : Watanabe et al.

It is certified that error appears in the above-identified patent and that said Letters Patent is hereby corrected as shown below:

Title page:

<u>At [30] FOREIGN APPLICATION PRIORITY DATA:</u>

Line 2,

"Aug. 4, 1989 [JP] Japan . . . . . . . . . 64-203031"
should read
--Aug. 4, 1989 [JP] Japan . . . . . . . . . 1-203031--.

<u>At [57] ABSTRACT:</u>

Line 5, "quantity" should read --quantity of--.

<u>COLUMN 2:</u>

Line 66, "measured" should read --measured.--.

<u>COLUMN 6:</u>

Line 32, "ing)" should read --ing).--.

UNITED STATES PATENT AND TRADEMARK OFFICE
CERTIFICATE OF CORRECTION

PATENT NO. : 5,109,236

DATED : April 28, 1992

INVENTOR(S) : Watanabe et al.

It is certified that error appears in the above-identified patent and that said Letters Patent is hereby corrected as shown below:

COLUMN 14:

Line 11, "si" should read --is--;

Line 18, "medium" should read --medium,--;

Line 31, "the" should be deleted.

Signed and Sealed this

Seventeenth Day of August, 1993

BRUCE LEHMAN

Attest:

Attesting Officer     Commissioner of Patents and Trademarks